(12) United States Patent
Ren et al.

(10) Patent No.: US 12,201,212 B2
(45) Date of Patent: Jan. 21, 2025

(54) FOOD PAN COOLING SYSTEM WITH ONE OR MORE PERFORATED FOOD PANS

(71) Applicant: ILLINOIS TOOL WORKS INC., Glenview, IL (US)

(72) Inventors: Liqun Ren, Haslet, TX (US); Sasenka Kukolj, Keller, TX (US); Ashutosh A. Potdar, Fort Worth, TX (US); James R. Wright, Grand Prairie, TX (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 84 days.

(21) Appl. No.: 17/527,623

(22) Filed: Nov. 16, 2021

(65) Prior Publication Data

US 2022/0151377 A1 May 19, 2022

Related U.S. Application Data

(60) Provisional application No. 63/114,776, filed on Nov. 17, 2020.

(51) Int. Cl.
| | |
|---|---|
| *A47B 31/02* | (2006.01) |
| *A47B 31/00* | (2006.01) |
| *A47J 41/00* | (2006.01) |
| *F25D 23/06* | (2006.01) |
| *F25D 31/00* | (2006.01) |

(52) U.S. Cl.
CPC ............ *A47B 31/02* (2013.01); *A47J 41/0061* (2013.01); *F25D 23/063* (2013.01); *F25D 31/006* (2013.01); *A47B 2031/003* (2013.01); *F25D 2331/809* (2013.01); *F25D 2400/08* (2013.01)

(58) Field of Classification Search
CPC .............. A47B 31/02; A47B 2031/003; A47J 41/0061; F25D 23/063; F25D 31/006; F25D 2331/809; F25D 2400/08
See application file for complete search history.

(56) References Cited

U.S. PATENT DOCUMENTS

| | | | |
|---|---|---|---|
| 6,202,432 B1 * | 3/2001 | Haasis ................... | A47F 3/0456 62/258 |
| 6,237,775 B1 * | 5/2001 | Hatch et al. ....... | B65D 21/0233 206/519 |
| 6,612,124 B1 * | 9/2003 | Hatch et al. ............ | A47F 10/06 62/258 |
| 2004/0168458 A1 | 9/2004 | Sung | |
| 2004/0168616 A1 | 9/2004 | Sung | |

(Continued)

OTHER PUBLICATIONS

Polar Ware Healthcare Catalog; dated Sep. 2020; 20 pages.

*Primary Examiner* — Elizabeth J Martin
*Assistant Examiner* — Dario Antonio DeLeon
(74) *Attorney, Agent, or Firm* — THOMPSON HINE LLP

(57) ABSTRACT

A food preparation table includes a housing at least in part defining multiple food pan receiving locations and a cooling air flow path internal of the housing below the food pan receiving locations. A first food pan is positioned within a first one of the food pan receiving locations such that side walls and a bottom wall of the first food pan are within the cooling air flow path, a first one of the side walls of the first food pan includes a plurality of openings therein to permit some cooling air to enter the first food pan and flow in contact with food items therein.

10 Claims, 5 Drawing Sheets

(56) References Cited

U.S. PATENT DOCUMENTS

| | | | |
|---|---|---|---|
| 2006/0201177 A1* | 9/2006 | Spillner | A47F 3/0447 |
| | | | 62/258 |
| 2006/0288723 A1* | 12/2006 | Hand | A47F 3/0443 |
| | | | 62/258 |
| 2009/0013707 A1 | 1/2009 | Spillner | |
| 2012/0309285 A1* | 6/2012 | Seiss et al. | F24F 5/00 |
| | | | 454/254 |
| 2012/0295002 A1 | 11/2012 | Seitz | |
| 2013/0216650 A1 | 8/2013 | Anis | |
| 2016/0345753 A1 | 12/2016 | Savinskiy | |
| 2016/0360773 A1* | 12/2016 | Pan et al. | A23L 3/40 |
| 2017/0258219 A1* | 9/2017 | Wilmes et al. | F25D 2400/08 |
| 2020/0352322 A1 | 11/2020 | Jackson | |
| 2021/0348830 A1 | 11/2021 | Ren | |

\* cited by examiner

FOOD PAN COOLING SYSTEM WITH ONE OR MORE PERFORATED FOOD PANS

TECHNICAL FIELD

This application relates generally to food preparation tables that hold and cool food pans and, more particularly, such food preparation tables that cool food pans by directing cooled air past the food pans.

BACKGROUND

Food preparation tables are commonly used in commercial establishments for preparing food products. A typical food preparation table includes a frame and housing structure having internal refrigeration or some other cooling system. An upper surface of the housing typically includes a front preparation surface and a rear food storage arrangement that may define multiple food pan wells (or other food pan receiving locations), where each food pan well holds one or more individual solid wall food pans for holding multiple individual food items that can be used in the preparation of food products. The pans are cooled in order to keep the food items in the pans fresh. One type of pan cooling system transfers heat from the food in the pan by directing cooled air past the solid walls of the food pan. If the food product is of a type that does not make significant contact with the walls of the food pan (e.g., eggs in the shell or some other food product), the heat transfer from the food product to the food pan walls can be less than required for some use environments (e.g., use environments with higher temperature ambient conditions).

It would be desirable to provide a food pan cooling system that can improve food item cooling in such cases.

SUMMARY

In one aspect, a food preparation table includes a housing at least in part defining multiple food pan receiving locations and a cooling air flow path internal of the housing below the food pan receiving locations. A first food pan is positioned within a first one of the food pan receiving locations such that side walls and a bottom wall of the first food pan are within the cooling air flow path. At least one of the side walls of the first food pan includes a plurality of openings therein to permit some cooling air to enter the first food pan and flow in contact with food items therein.

In another aspect, a food preparation table includes a housing at least in part defining multiple food pan receiving locations and a cooling air flow path internal of the housing below the food pan receiving locations. A first food pan is positioned within a first one of the food pan receiving locations such that first, second, third and fourth side walls and a bottom wall of the first food pan are within the cooling air flow path, the first and second side walls of the first food pan including a plurality of openings therein to permit some cooling air to enter the first food pan and flow in contact with food items therein. The first side wall is oriented substantially parallel to a main flow direction of cooling air within the cooling air flow path and the second side wall is oriented substantially parallel to the main flow direction.

In a further aspect, a method of cooling food product involves: placing a non-liquid food product in a food product pan within a pan receiving location of a food preparation table, wherein the food product pan includes first and second side walls opposed to each other and running along a length of the food product pan, wherein each of the first and second side walls includes a plurality of openings therein; and operating a refrigeration system of the food preparation table to deliver cooled air in a main flow direction past the food product pan, wherein the main flow direction is substantially parallel to the length of the food product pan, such that at least some cooled air passes through the openings if the first and second side walls to move directly over and cool the non-liquid food product in the food product pan.

The details of one or more embodiments are set forth in the accompanying drawings and the description below. Other features, objects, and advantages will be apparent from the description and drawings, and from the claims.

DETAILED DESCRIPTION

Figure 1:
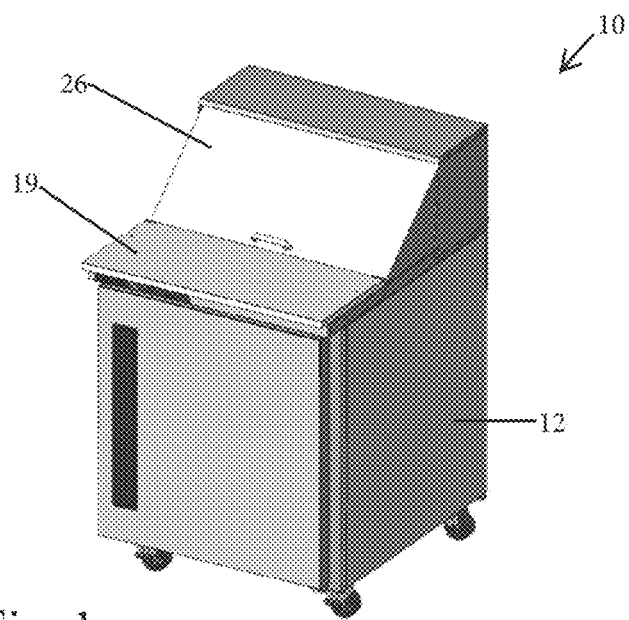
FIGS. 1 and 2 show perspective views of a food preparation table.
Figure 2:
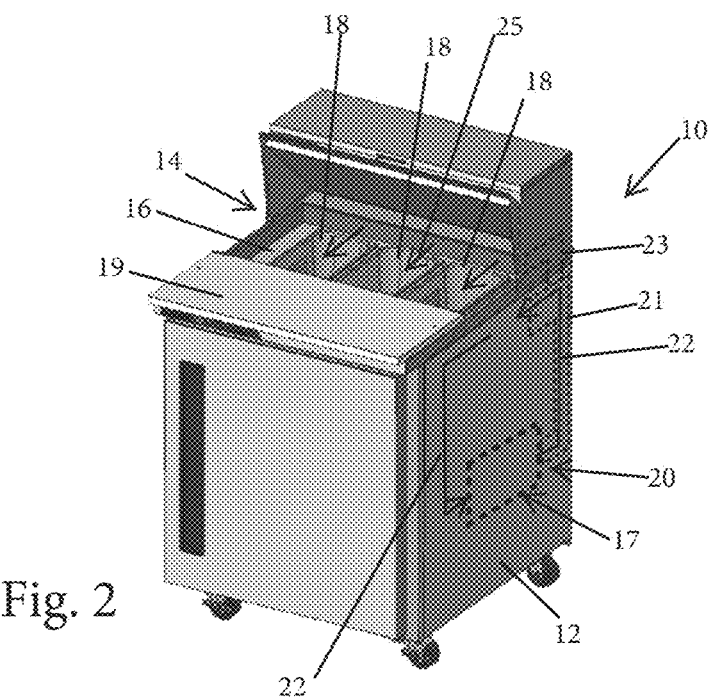

Referring to FIGS. 1 and 2, a food preparation table 10 is shown schematically and includes a housing 12 (e.g., frame and panels) with a food item holding arrangement 14 (e.g., upper housing section with a recessed well area and pan support structure) defining multiple food pan receiving locations 16 (three shown here). Each food pan receiving location supports, or is configured to support, at least one food pan 18. A front section of the food preparation table defines a working counter or surface 19, at which food products can be prepared. In one embodiment, the surface 19 is defined by an HDPE material suitable for use as a cutting board, but metal, such as stainless steel, could also form the surface. A cooling system 20 (e.g., refrigeration system with a refrigerant circuit including a condenser, compressor and evaporator, and a fan for moving air that is cooled (all collectively shown as 17) and internal ducting 21) is provided for cooling the food pans using the flow of cooling air that moves per arrows 22. The cooling air flow moves past the food pans in a main flow direction (here back to front) to remove heat from the food pan walls. The food pan area can be closed by a movable cabinet door 26 when the preparation table is not in use.

Figure 3:
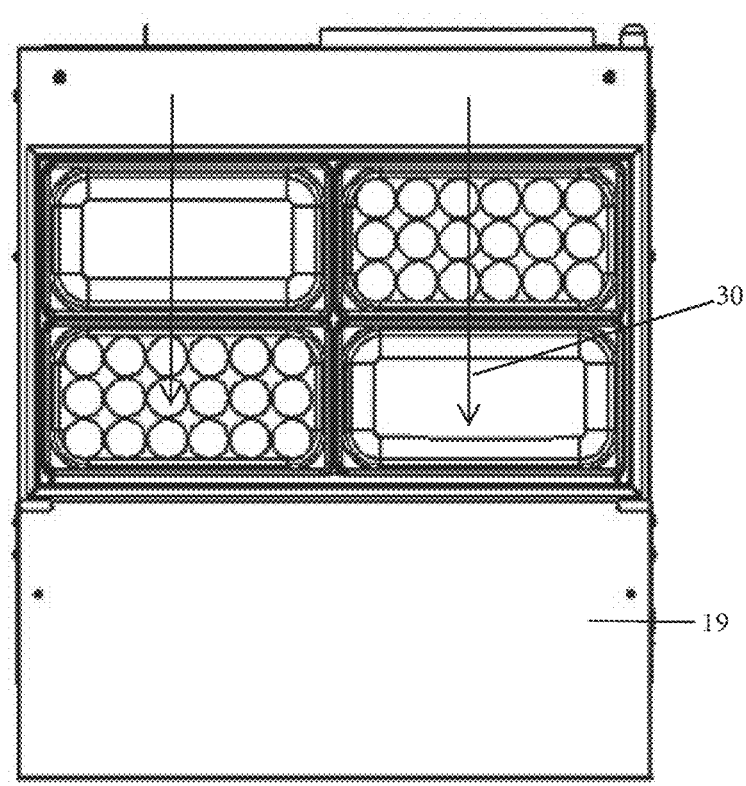
FIG. 3 shows a top plan view of one food pan arrangement.

Referring to FIG. 3, an exemplary arrangement of four solid wall food pans is shown, oriented with the long direction of the pans perpendicular to the main direction 30 of cooling air flow. This arrangement has been found undesirable in certain environments, as too much air flow is blocked and not enough cooling air moves past the food pan walls.

Figure 4:
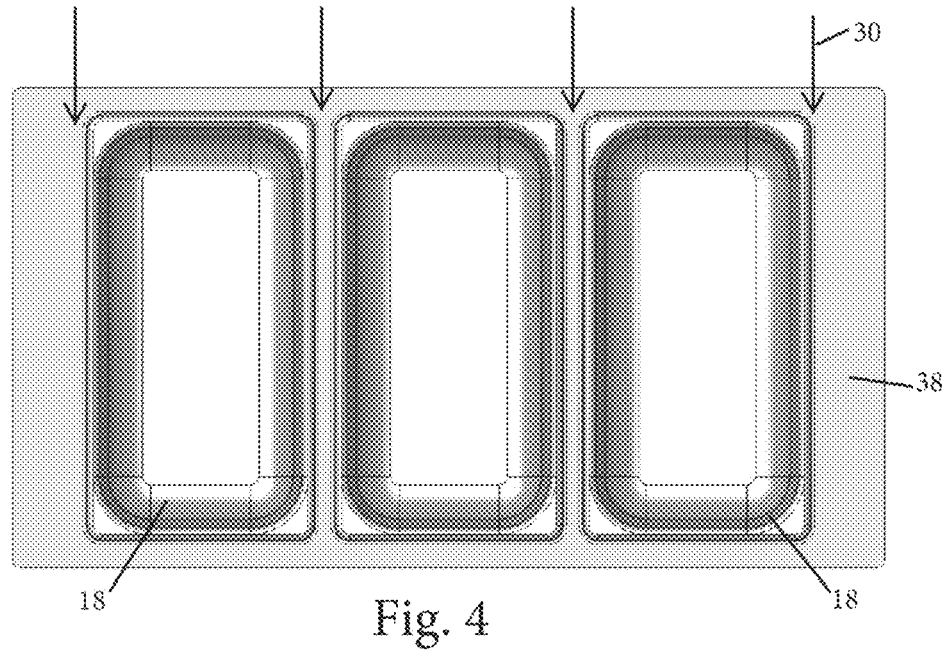
FIGS. 4 and 5 show partial top plan and perspective views of another food pan arrangement.
Figure 5:
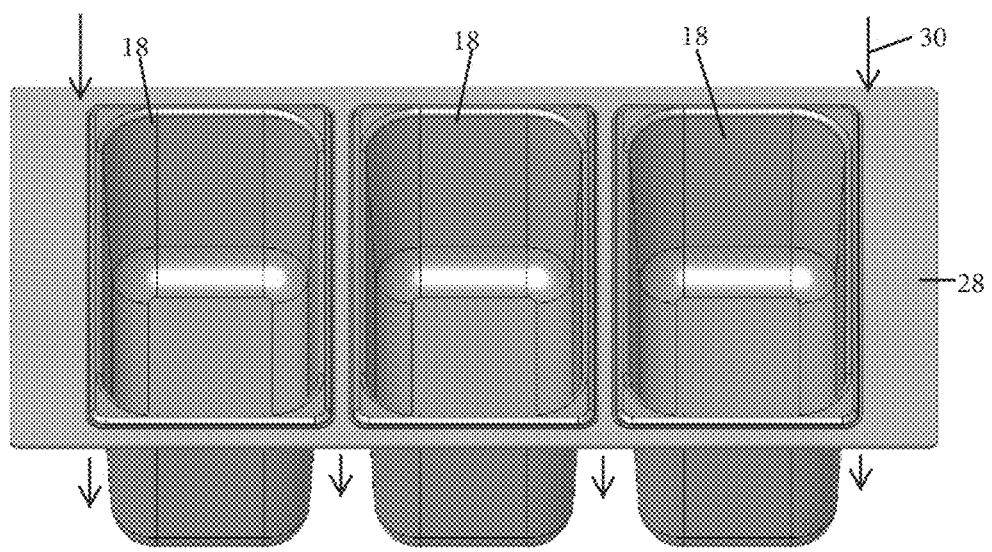

Some improvement of cooling is achievable by reorienting the food pans 18 so that the long direction of the pans runs parallel to the main flow direction 30 of the cooling air, per FIGS. 4 and 5, and reducing the number of food pans 18 (here three instead of four). Still, in the case of food pans holding items such as eggs in the shell (or other solid food products, e.g., meatballs), more effective cooling may be needed for some higher ambient temperature use environments. This can be achieved using food pans with one or more side walls, and potentially the bottom wall, having a plurality of openings that permit some cooling air to enter the food pan and flow along the surfaces of the food items (e.g., some cooling air directly contacts the food items).

Here, the food pans 18 are supported by an adapter plate 28 that covers a main well area of the housing, and the adapter plate 28 has multiple food pan openings. The adapter plate 28 converts the space previously intended for four pans, oriented with long directions perpendicular to the main flow direction 30 of cooling air (per FIG. 3), to a space for holding three pans oriented with long directions parallel to the main flow direction 30. By way of example, the plate 28 may be stainless steel, or could alternatively be an HDPE material, which provides a better thermal insulating factor and experiences less condensation than stainless steel.

Figure 6:
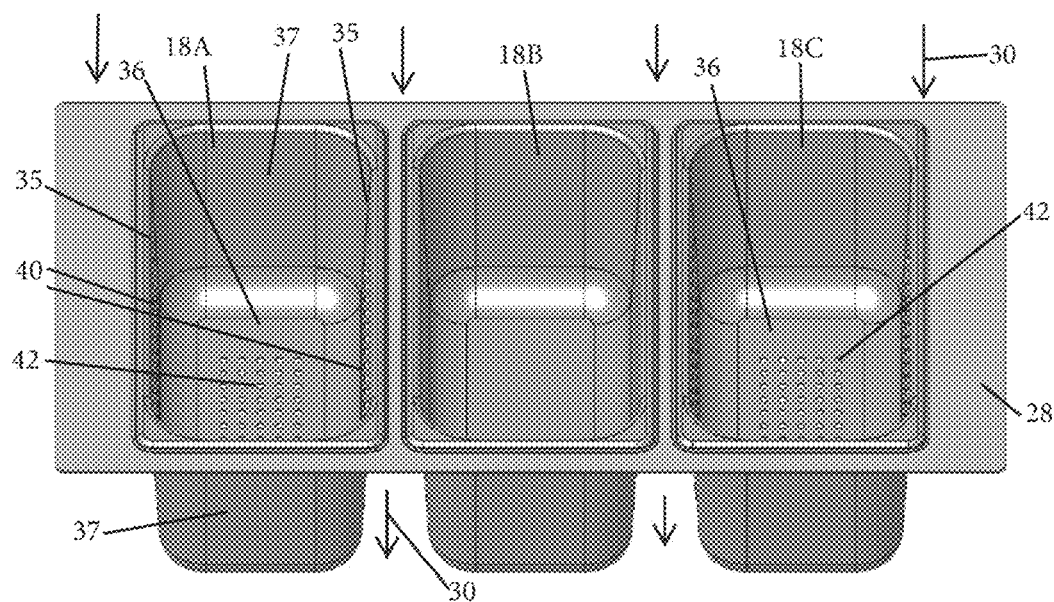
FIG. 6 shows a partial perspective view of a food pan arrangement including side food pans with perforations.

FIG. 6 shows an embodiment in which the side food pans 18A and 18C include long side walls 35 (here, the side walls running substantially parallel to the main flow direction 30) with a plurality of openings 40 and a bottom wall 36 with a plurality of openings 42. The side food pans 18A and 18C hold, for example, eggs in the shell, and the openings 40 and 42 permit some cooling air to reach the eggs for enhanced cooling. The center food pan 18B includes all solid walls, and holds, for example, liquid egg product.

Notably, the shorter end walls 37 (here, the end walls running substantially perpendicular to the main flow direction 30) of the food pans 18A and 18C do not include any openings. Having openings in the short end wall 37 that faces against the main flow direction (the upper end wall 37 in FIG. 6) would be less desirable because too much cooling air would escape into the food pan and then to the surrounding environment when the movable cabinet door 26 is open. Having openings in the short end wall 37 that faces with the main flow direction (the lower end wall 37 in FIG. 6) would suck warmer air for additional heat gain. Openings in the short walls would also result in (1) additional moisture infiltration—thereby increasing coil fouling, and resulting in higher compressor run time, and (2) a reduction in the amount of air flow along the sides of center pan 18B, which could have an adverse impact on liquid egg temperatures.

Figure 7:
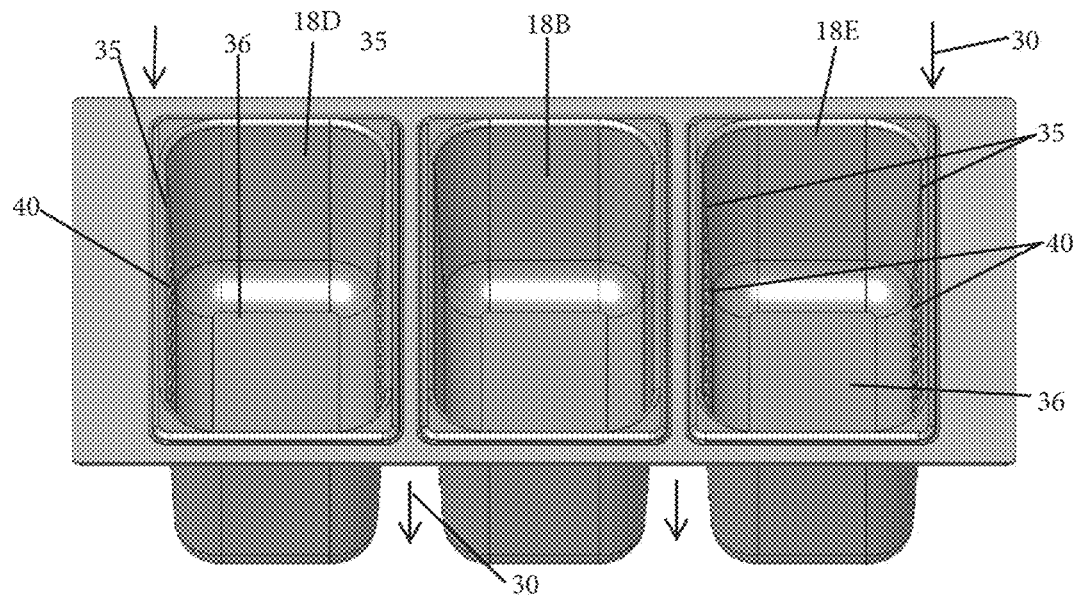
FIG. 7 shows a partial perspective view of another food pan arrangement including side food pans with perforations.

FIG. 7 shows an embodiment in which the lateral food pans 18D and 18E include long side walls 35 with the openings 40, but no openings in the bottom wall 36. This variation may be desired to avoid any material (e.g., egg from a cracked egg or oil from a meatball) falling internally of the housing 12, which would cause more difficulty from a cleaning perspective. In addition, this embodiment tends to reduce necessary compressor run time because there is less air infiltration into the food pans 18D and 18E. However, both food pan arrangements 18A, 18C and 18D, 18E experience improved performance cooling solid food product as compared to use of only solid pans.

Figure 8:
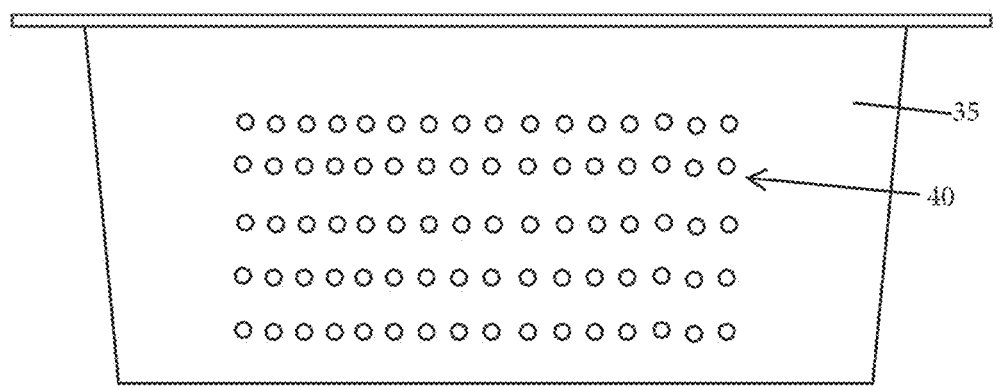
FIG. 8 shows a side elevation view of a pan with an exemplary pattern of openings in the side wall.

FIG. 8 shows one exemplary pattern of openings 40 distributed over the pan side wall 35.

It is to be clearly understood that the above description is intended by way of illustration and example only, is not intended to be taken by way of limitation, and that other changes and modifications are possible. For example, additional internal ducting could be provided, per 23 in FIG. 2, to deliver a portion of the cooled air in a flow 25 above and/or over the perforated food pans.

What is claimed is:

1. A food preparation table, comprising:
   a housing at least in part defining multiple food pan receiving locations, a refrigeration system within the housing and a cooling air flow path internal of the housing and leading from the refrigeration system to a region below the food pan receiving locations and back to the refrigeration system;
   a first food pan positioned within a first one of the food pan receiving locations such that side walls and a bottom wall of the first food pan are within the cooling air flow path, a first one of the side walls of the first food pan includes a plurality of openings therein to permit cooling air to enter the first food pan and flow in contact with food items therein, and the bottom wall of the first food pan includes a plurality of openings therein to allow the passage of cooling air therethrough, wherein the plurality of openings in the first one of the side walls are distributed along a majority of a height of the first one of the side walls for effective distribution of cooling air through a depth of food items in the first food pan, such that cooling air delivered into the pans is recirculated back to the refrigeration system;
   wherein the first one of the side walls is oriented parallel to a main flow direction of cooling air flowing past the first food pan along the cooling air flow path.

2. The food preparation table of claim 1, wherein a second one of the side walls runs perpendicular to the main flow direction and has an external surface that faces against the main flow direction, wherein the second one of the side walls does not include any openings.

3. The food preparation table of claim 2, wherein a third one of the side walls runs perpendicular to the main flow direction and has an external surface that faces toward the main flow direction, wherein the third one of the side walls does not include any openings.

4. The food preparation table of claim 3, wherein a fourth one of the side walls is oriented parallel to the main flow direction, the fourth one of the side walls having a plurality of openings therein.

5. The food preparation table of claim 2, wherein the first one of the side walls is longer than the second one of the side walls, such that a long direction of the first food pan is oriented parallel to the main flow direction.

6. The food preparation table of claim 1, further comprising:
   a second food pan within a second one of the food pan receiving locations such that side walls and a bottom wall of the second food pan are within the cooling air flow path, wherein the side walls and the bottom wall of the second food pan do not include any openings.

7. The food preparation table of claim 6, wherein the first food pan holds solid food product, wherein the second food pan holds liquid food product.

8. The food preparation table of claim 7, wherein the first food pan holds eggs in the shell, wherein the second food pan holds liquid eggs.

9. The food preparation table of claim 7, further comprising:
   a third food pan within a third one of the food pan receiving locations such that side walls and a bottom wall of the third food pan are within the cooling air flow path, wherein at least one of the side walls of the third food pan includes a plurality of openings.

10. The food preparation table of claim 9, wherein the second food pan is located between the first food pan and the third food pan.

\* \* \* \* \*